April 29, 1969   P. VAN HOOF   3,440,670
DEVICE FOR FASTENING A SANITARY PIECE
Filed Feb. 7, 1967
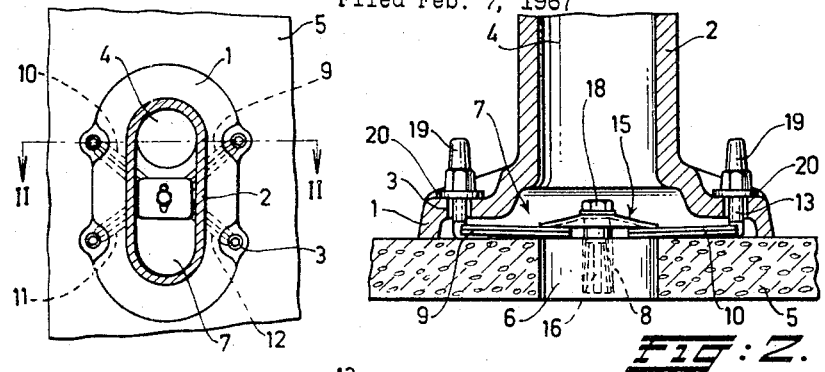
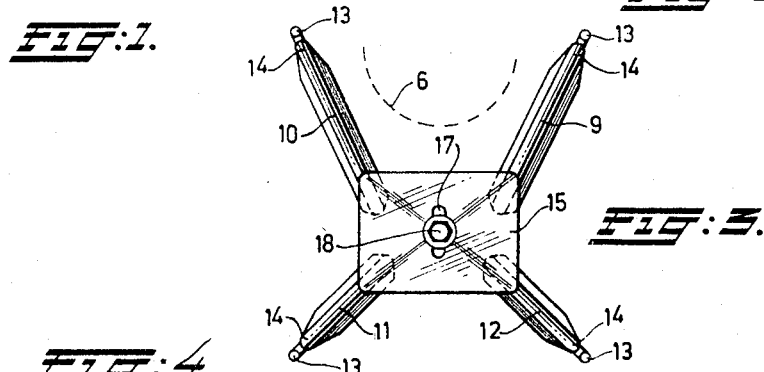
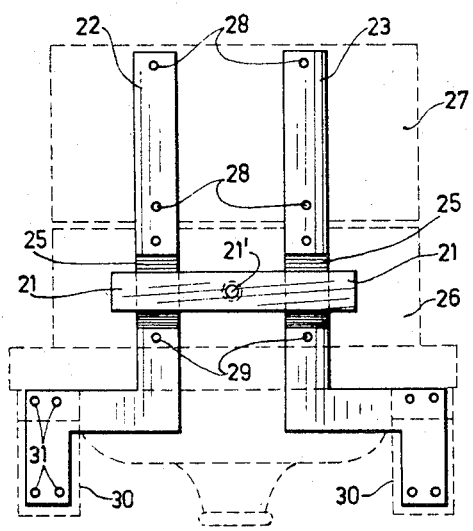
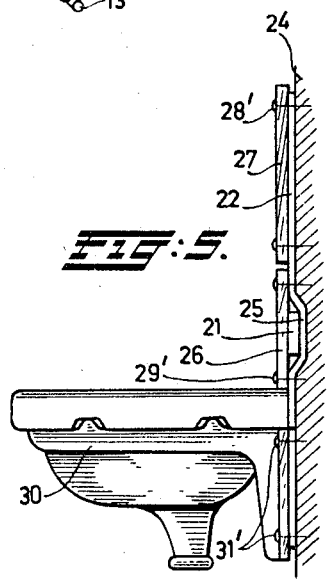
INVENTOR.
PETRUS VAN HOOF
BY
ATTORNEYS United States Patent Office
3,440,670
Patented Apr. 29, 1969

3,440,670
DEVICE FOR FASTENING A SANITARY PIECE
Petrus van Hoof Strijpsestraat 91,
Eindhoven, Netherlands
Filed Feb. 7, 1967, Ser. No. 614,486
Claims priority, application Netherlands, Feb. 7, 1966,
Int. Cl. E03d 11/00; E03c 1/32; A47k 1/04
U.S. Cl. 4—252                                    6 Claims

ABSTRACT OF THE DISCLOSURE

Sanitary pieces, especially WC-pots and washing stands, are fastened through their normal fastening openings to an intermediate plate, which plate is fixed to the floor or wall by one single bolt. For any definite type of sanitary article the intermediate plate is provided with threaded holes or fixed bent up threaded ends, corresponding with the openings in the article. In a construction for universal use, threaded ends are provided on loose strips. The position of these threaded ends is then made to link up with the fastening openings in the sanitary piece, and the other ends of the strips are together clamped between the intermediate plate and the floor or wall when fixing the intermediate plate thereto.

---

The invention relates to a device for fastening a sanitary piece, especially a WC-pot, to a bearing face such as a floor, and its general object is to reduce labour in mounting and replacing sanitary articles as above mentioned.

Sanitary pieces such as WC-pots and washing stands are generally in use, which are provided in their manufacture with bolt holes at definitely chosen locations, and it is usually necessary to arrange a plurality of holes in the bearing face—either a floor or a wall—often consisting of hard material such as concrete, in which fastening means such as bolts and plugs can be inserted. The place thereof must each time be measured out in exact correspondence with the location of the openings in the sanitary article.

Further difficulties arise in avoiding weak spots in the bearing face, and especially in case of replacement of WC-pots the floor will often have been weakened in places so that the fastening means will not find a sufficient hold at the locations where they should normally be arranged.

Various constructions were proposed already for applying intermediate members between the sanitary piece and the floor. These proposals implied several complications, they did not meet all difficulties and they were not applicable for the construction of WC-pots as it is generally in use.

The primary object of the present invention is to provide a fastening plate which—starting from the fact that sanitary pieces have fastening openings with a fixed mutual position—is arranged between the sanitary piece and the face to which it is to be fastened and which has a plurality of fastening means with a mutual position corresponding to the mutual position of the openings in the sanitary piece.

It is a further object of the invention to provide for a plurality of loose, strip-like parts, on which the fastening means are arranged, which strips can be placed under the fastening plate and pressed by the latter against the wall or floor.

Other objects of the invention, and the manner in which they are realized, will appear from the following detailed description which is to be read in connection with the accompanying drawings, in which two embodiments are represented. In the drawing:

FIG. 1 is a horizontal section through a WC-pot, showing a top view of the foot, fastened with a device according to the invention in a first embodiment;

FIG. 2 is a cross sectional view on enlarged scale along the line II—II in FIG. 1;

FIG. 3 is a top view of the fastening device used in FIGS. 1 and 2;

FIG. 4 is an elevational view of another embodiment of the fastening device for a washing stand;

FIG. 5 is a side view to FIG. 4, with the washing stand mounted.

In FIG. 1 the foot 1 of the WC-pot has been cut off from the body according to a horizontal section through the hatched portion 2 of the column. In the foot 1 four bolt holes 3 are spaced during the manufacture for the fastening of the pot on the floor, base, or bearing surface 5, which contains in the usual manner (see also FIG. 2) the opening 6, through which the discharge 4 is led. At a location below the cavity 7 of the foot a single bore hole 8 is made in the floor 5.

For mounting the WC-pot, one initially arranges the pot in the normal and correct position with respect to the discharge hole 6, to subsequently mark off through the bore holes 3 the locations of these bore holes on the floor. After taking away the pot one puts the four L-shaped strips 9, 10, 11 and 12 on the floor in such manner that above each of the locations of the bore holes 3 which are marked off on the floor 5 a threaded end 13 is projecting upwardly (see also FIG. 3), the other ends of the strips 9–12 being directed to a central point somewhere in front of the discharge hole 6. On these ends the common, substantially flat intermediate mounting plate 15 is placed, the length over which the strip portions are projecting below the plate 15, and also the mutual angle between them, being different in dependence on the location chosen for the boring 8 in the floor, where the bolt connection will find a sufficient hold. Now one puts a bolt 16 through the wide central opening 17 in the plate 15 and through the borehole 8 in the floor 5, using if desired any known plug members, to subsequently fix the bolt 16 firmly by a nut or, as in the embodiment shown, by the head 18 of the bolt. Then the pot 1 can be put on its place again, each of the threaded ends 13 extending upwardly through a boring 3 of the pot. Finally the pot can then be fastened by screwing nuts, or preferably caps 19 are represented, which have inner thread, on the threaded ends, using a resilient intermediate ring 20 (see FIG. 2).

In FIGS. 1–3 the embodiment is shown, where threaded ends 13, bent in L-shape, are welded to the underside of each of the four strips 9–12—which have a substantially flat undersurface for contact with the floor—at the location of a cavity 14 which is bent upwardly to give room for the threaded portion 13. The cavity 14 may be part of a strengthening ridge, extending over the entire length of each of the strips 9–12. In another embodiment, which is not shown, the ends of the strips itself may be rolled and bent into L-shape, and provided with thread. Both these embodiments, having an intermediate plate and loose strips, have the advantage that they may be applied for a range of sanitary articles with various mutual distance of the fastening openings, whilst also the place of the central bolt 16 may—within a wide range—be chosen at will. The idea of the present invention may be applied in its most general form when a special intermediate plate is manufactured for each type of WC-pot or other article. The loose strips are then superfluous, and the fastening means are provided directly on the plate, by threaded upwardly bent plate parts, or simply by a number of openings, eventually threaded, in either case corresponding with the location of the fastening openings in the sanitary piece. The intermediate plate will be then be bigger than the one represented in FIGS. 1–3.

In the embodiment according to FIGS. 4 and 5 the intermediate plate is constituted by a strip 21. In this case two mirror-symmetrically disposed strips 22 and 23 have been shoved between the strip 21 and the wall. The fastening means provided in these strips are constituted by threaded holes as will be described below. The strips 22 and 23 will lie flatly against the wall 24, and in order to prevent the forward protrusion of the strip 21, the strips 22 and 23 in this case have a backwardly bent portion 25 sunk in the wall 24. When there is no objection for the sanitary parts arranged at a certain location, in this case a marble plate 26 and a mirror 27, to lie somewhat in front of the wall, the backward bending 25 in the strips 22 and 23 can be deleted. The various parts mounted by means of the fastening device have been indicated in FIG. 4 by dotted lines and are visible in FIG. 5 in side view.

When mounting the device, the strips 22 and 23 are held against the wall in their correct positions, and the strip 21 is pushed against them, and fastened by means of the bolt 21′, using wall plugs or any other desired means, well known for arranging bolts in walls.

For the fastening of the mirror 27, in which borings have been arranged at certain locations during manufacture, the threaded borings 28 are provided in the strips 22, 23; for the marble plate 26 the threaded borings 29 will serve and for the brackets 30, which support the normal washing stand, the threaded borings 31 are provided. The fasteenening can then be done by bolts such as 28′, 29′ and 31′, placed through the borings in the parts to be fastened, and screwed into the holes 28, 29 and 31.

Instead of the borings 28, 29, 31, with bolts 28′, 29′, 31′, one may use slide pieces which clamp on the strips 22 and 23, and which may be of the type having a threaded bolt end projecting forwardly from the front face of the slide piece, or a central threaded hole, or clamping edges or wings for fastening the parts such as the washing stand, the marble plate and the mirror with respect to the strip. Slide pieces and clamping pieces of this kind are essentially known, and therefore they have not been represented in the drawing.

It will be understood that various alterations in the device described may be made by a man skilled in the art, especially for adapting the inventive idea to special constructions and embodiments of sanitary pieces. Therefore I do not wish to be limited to the details described and shown in the drawing, further than I am limited by the scope of the following claims.

I claim:

1. A device for fastening a sanitary piece relative to a bearing surface, said sanitary device having a plurality of fastening openings therein, comprising:

a separate, intermediate mounting plate fixed to said bearing surface, said mounting plate having a central opening therein; securing means extending through said central opening fixedly securing said mounting plate relative to said bearing surface; a plurality of separate, generally bar shaped fastening means for fastening said sanitary piece relative to said mounting plate, each of said fastening means having means defining a connection point, said fastening means extending substantially radially outwardly from said central opening and being slidably adjustable along said bearing surface and having both linear and angular motion relative to said mounting plate so as to adjust the position of said fastening means relative to said sanitary piece to permit said connection points to be substantially aligned with said fastenng openings, thereby permitting said sanitary piece to be fixedly secured relative to said fastening means with said fastening means being fixedly maintained in said adjusted position by said mounting plate.

2. A device as defined in claim 1, wherein each of said fastening means is L-shaped and has first and second fixedly interconnected leg portions with said second leg portion extending substantially transversely of said first leg portion, said first leg portion extending substantially parallel to a plane containing said mounting plate and being in contact with and movable relative to said mounting plate so as to position said fastening means in an adjusted position wherein said second leg portion extends into one of the fastening openings formed in said sanitary piece, said fastening means being held in said adjusted position by said mounting plate, and said second leg portion having thread means thereon for permitting said sanitary piece to be fixedly secured to said fastening means.

3. A device as defined in claim 1, wherein each of said fastening means has only a single connection point thereon for cooperating with one of said fastening openings formed in said sanitary piece, and each of said fastening means comprising a separate member with each of said members being movable relative to said mounting plate and independently of said other fastening means.

4. A device for fastening a sanitary piece relative to a bearing surface, said sanitary device having a plurality of fastenng openings therein comprising:

a separate, intermediate mounting plate capable of being fixedly secured relative to said bearing surface, said mounting plate having means for permitting said mounting plate to be fixedly secured relative to said bearing surface; a plurality of fastening means fastening said sanitary piece to said mounting plate, each of said fastening means comprising a plate-like member with one end of said plate-like member being positioned between said mounting plate and said bearing surface and being slidably adjustable along said bearing surface and having both linear and angular motion relative to said mounting plate for permitting said fastening means to be moved to a desired position; each of said plate-like members having connection means remote from said one end with said connection means being positioned substantially adjacent to and aligned with one of said fastening openings formed in said sanitary piece when said plate-like member is in said desired position, said sanitary piece being fixedly connected to said fastening means when each of said fastening means is in said desired position; said one end of each of said plate-like members being clamped between said mounting plate and said bearing surface when said mounting plate is fixedly secured relative to said bearing surface for fixedly holding said fastening means in said desired position.

5. A device for fastening a sanitary piece relative to a bearing surface, said sanitary piece having a plurality of fastening openings therein, comprising:

a separate, intermediate mounting plate fastened to and mounted so that it lies in a plane substantially parallel to and spaced from said bearing surface by means of a plurality of fastening means, said mounting plate having an opening therein for permitting said mounting plate to be secured relative to said bearing surface; a said plurality of fastening means for securing said sanitary piece relative to said mounting plate, the number of fastening means being equal to the number of said fastening openings formed in said sanitary piece; each of said fastening means comprising an elongated element having a threaded leg portion fixedly secured thereto and extending transversely therefrom adjacent one end of said elongated element, the other end of said elongated element being positioned adjacent to and slidable relative to said mounting plate for permitting said elongated element to be moved to a desired, adjusted position wherein said tranvsersely extending leg portion is positioned in substantial alignment wth and extends into one of said fastening openings; and means for fixedly securing said fastening means relative to said mounting plate in said desired adjusted position to thereby fixedly position said sanitary device relative to said mounting plate.

6. A plumbing construction comprising:
a base having a discharge opening therethrough and also having first mounting means offset from said discharge opening; a sanitary piece mounted on said base and having a discharge conduit communicating with said discharge opening for enabling the contents of said sanitary piece to be discharged through said discharge opening, said sanitary piece also having a plurality of first fastening means on opposite sides of said discharge opening; a separate intermediate mounting plate having second mounting means connected to said first mounting means and securing said mounting plate on said base at a position offset from said discharge opening; said mounting plate having a plurality of separate fastening means extending away therefrom in opposite directions, each of said fastening means having second fastening means spaced radially from said mounting plate and aligned with and connected to a first fastening means on said sanitary piece whereby said sanitary piece is connected to said base.

References Cited

UNITED STATES PATENTS

| | | | |
|---|---|---|---|
| 802,076 | 10/1905 | Hinsdale | 4—252 |
| 879,176 | 2/1908 | Jackson | 4—252 |
| 986,905 | 3/1911 | Carlson | 4—252 |
| 1,061,632 | 5/1913 | Podolsky | 4—252 |
| 1,194,826 | 8/1916 | Donovan | 4—252 |
| 2,035,301 | 3/1936 | Daugherty | 4—170 |
| 2,817,094 | 12/1957 | Lessley | 4—170 |
| 3,011,177 | 12/1961 | Haughey | 4—170 |
| 3,118,147 | 1/1964 | Larkin | 4—170 |

FOREIGN PATENTS 110,990  6/1944  Sweden.

LAVERNE D. GEIGER, *Primary Examiner.*

D. MASSENBERG, *Assistant Examiner.*

U.S. Cl. X.R.

4—170